(12) United States Patent
Kurokawa (10) Patent No.: US 11,535,249 B2
(45) Date of Patent: Dec. 27, 2022

(54) VEHICLE ACTION DETERMINING METHOD AND VEHICLE ACTION DETERMINING DEVICE

(71) Applicant: Nissan Motor Co., Ltd., Yokohama (JP)

(72) Inventor: Takato Kurokawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/634,189

(22) PCT Filed: Aug. 13, 2019

(86) PCT No.: PCT/IB2019/000786
§ 371 (c)(1),
(2) Date: Feb. 9, 2022

(87) PCT Pub. No.: WO2021/028708
PCT Pub. Date: Feb. 18, 2021

(65) Prior Publication Data
US 2022/0355793 A1 Nov. 10, 2022

(51) Int. Cl.
*B60W 30/095* (2012.01)
*B60W 10/18* (2012.01)
*B60W 60/00* (2020.01)

(52) U.S. Cl.
CPC ......... *B60W 30/0956* (2013.01); *B60W 10/18* (2013.01); *B60W 60/0027* (2020.02);
(Continued)

(58) Field of Classification Search
CPC ......... B60W 30/0956; B60W 2520/10; B60W 2552/05; B60W 2554/4029;
(Continued)

(56) References Cited

U.S. PATENT DOCUMENTS

2012/0218093 A1* 8/2012 Yoshizawa .......... B60W 30/095 340/435
2016/0335892 A1* 11/2016 Okada ............. B60W 30/18145
(Continued)

FOREIGN PATENT DOCUMENTS

JP 2015-170233 A 9/2015
JP 2017-111575 A 6/2017
(Continued)

*Primary Examiner* — Hunter B Lonsberry
*Assistant Examiner* — Daniel M. Robert
(74) *Attorney, Agent, or Firm* — Young Basile Hanlon & MacFarlane, P.C.

(57) ABSTRACT

A method for determining a vehicle action includes: by a controller that acquires travel situation information of a road on which a host vehicle travels and determines a driving action from the travel situation information, setting at least one control determining point on a first route on which the host vehicle travels, the control determining point determining whether to run or stop the host vehicle; and determining whether to run or stop the host vehicle at the control determining point before the host vehicle reaches the point. The controller determines whether or not the host vehicle enters a road on which another vehicle or a pedestrian travels or walks with priority over the host vehicle on the first route; and where it is determined that the host vehicle enters the road on which the other vehicle or pedestrian travels or walks with priority, sets the control determining points more densely.

17 Claims, 7 Drawing Sheets

(52) U.S. Cl.
CPC ..... *B60W 2520/10* (2013.01); *B60W 2552/05* (2020.02); *B60W 2554/4029* (2020.02)

(58) Field of Classification Search
CPC ............. B60W 60/0027; B60W 10/18; B60W 30/18154; B60W 30/18159; B60W 30/18163; B60T 7/12
See application file for complete search history.

(56) References Cited

U.S. PATENT DOCUMENTS

| | | |
|---|---|---|
| 2017/0166220 A1 | 6/2017 | Ando |
| 2018/0208199 A1 | 7/2018 | Fujita et al. |
| 2019/0035278 A1 | 1/2019 | Mishina et al. |
| 2019/0384302 A1* | 12/2019 | Silva .................... G05D 1/0248 |
| 2020/0209873 A1* | 7/2020 | Chen .................... G05D 1/0088 |

FOREIGN PATENT DOCUMENTS

| | | |
|---|---|---|
| WO | 2017013750 A1 | 1/2017 |
| WO | 2017126249 A1 | 7/2017 |

* cited by examiner

VEHICLE ACTION DETERMINING METHOD AND VEHICLE ACTION DETERMINING DEVICE

TECHNICAL FIELD

The present disclosure relates to a method and apparatus for determining a driving action of a host vehicle.

BACKGROUND ART

As a control for determining a driving action of a host vehicle, JP2015-170233A discloses a control when the host vehicle crosses an oncoming lane and turns at a cross-point. Specifically, an intersection between a travel route of the host vehicle and a travel route of another vehicle traveling in the oncoming lane is extracted, it is estimated whether or not the host vehicle and the other vehicle collide with each other at the intersection. When it is determined that the host vehicle does not collide with the other vehicle, let the host vehicle enter the cross-point, and when it is determined that the host vehicle does not collide with the other vehicle, let the host vehicle stop before the cross-point.

SUMMARY OF INVENTION

However, when it is determined that a host vehicle is traveling or stopped at an intersection of two travel routes as described in the above document, once it is determined that the host vehicle can enter a cross-point, for example, a content determined for the intersection is taken over before and after the intersection, and different determinations are not made before and after the intersection. Therefore, in a scene in which the host vehicle enters a road on which another vehicle preferentially travels, in a situation where a situation change occurs such as a case where a vehicle speed of the other vehicle changes, for example, in a case where the situation changes to a situation where the host vehicle is desired to stop before the intersection, there are cases in which an action cannot be flexibly determined, the host vehicle enters the intersection, and the host vehicle stops at a position distant from the intersection. That is, it is difficult to flexibly determine an action suitable for a travel situation by merely determining whether the host vehicle can enter or stop at a position of the intersection between the travel route of the host vehicle and the travel route of the other vehicle traveling in an oncoming lane.

Therefore, in view of the above-mentioned problem, an object of the present disclosure is to provide a method for determining a driving action that can flexibly respond to a change in a situation.

According to one embodiment of the present invention, a method for determining a vehicle action, applicable to a travel control device, is provided. The method comprises: by a controller configured to acquire travel situation information of a road on which a host vehicle travels detected by a sensor and determine a driving action from the travel situation information, setting at least one control determining point on a first route on which the host vehicle travels while traveling on the first route, the control determining point determining whether to run or stop the host vehicle by using the travel situation information; and determining whether to run or stop the host vehicle at the control determining point before the host vehicle reaches the control determining point, is provided. The controller is further configured to: determine, based on the travel situation information, whether or not the host vehicle enters a road on which another vehicle or a pedestrian travels or walks with priority over the host vehicle on the first route on which the host vehicle travels; and in a case where it is determined that the host vehicle enters the road on which the other vehicle or the pedestrian travels or walks with priority over the host vehicle, set the control determining points more densely than in other cases.

DESCRIPTION OF EMBODIMENTS

Hereinafter, embodiments according to the present disclosure will be described with reference to drawings. In the embodiments, a case where an apparatus for determining a vehicle action according to the present disclosure is applied to a travel support system 100 mounted on a vehicle will be described.

Figure 1:
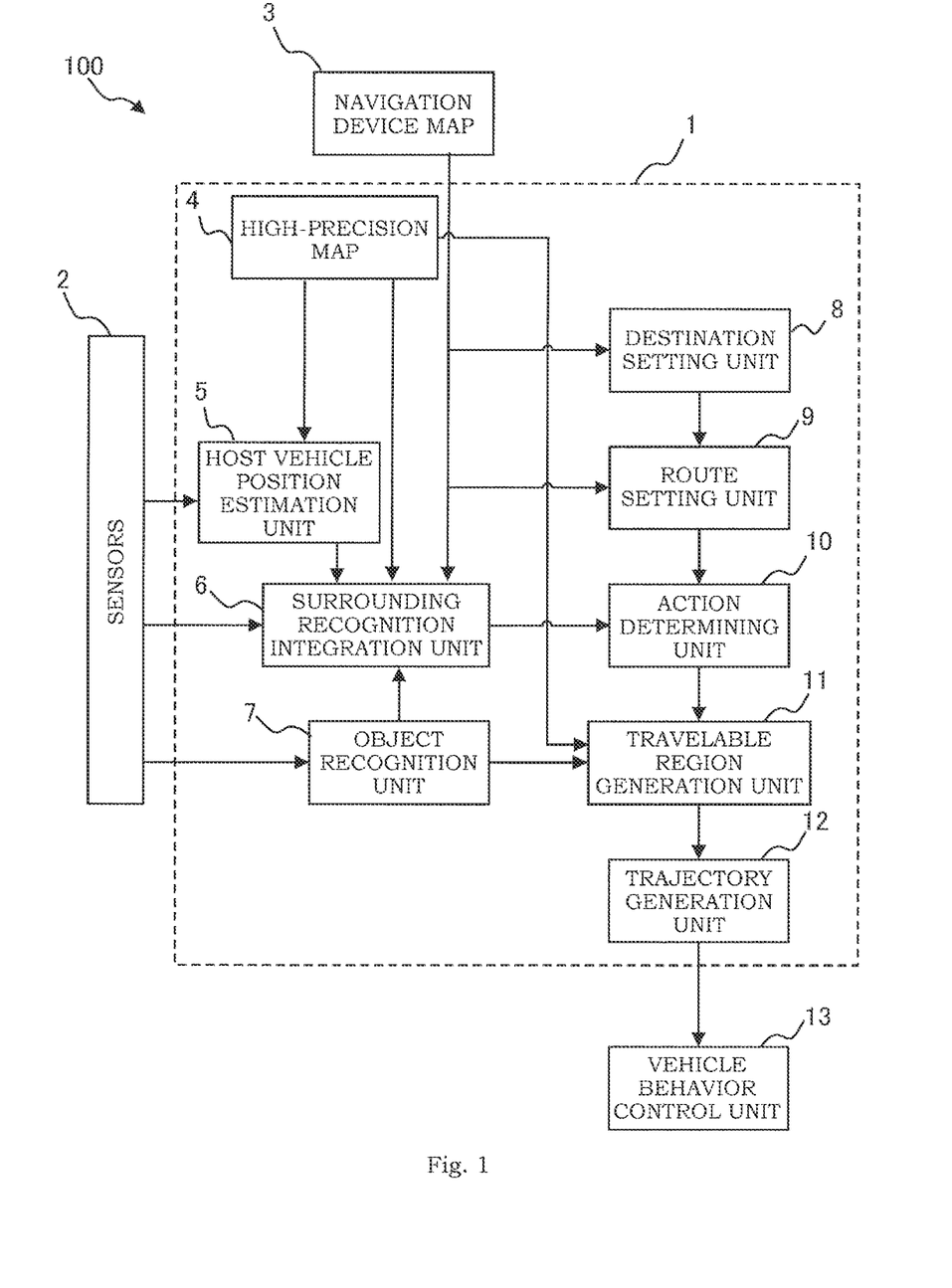
FIG. 1 is a schematic configuration diagram of a travel support system.

FIG. 1 is a configuration diagram of the travel support system 100. The travel support system 100 includes at least a travel support device 1 as a controller, sensors 2, a navigation device map 3, and a vehicle behavior control unit 13.

The sensors 2 detect information on a surrounding environment of the host vehicle. The surrounding environment includes other vehicles, pedestrians, facilities around roads, and the like. The sensors 2 include cameras, radars, a light detection and ranging (LIDAR), and the like mounted on a vehicle. The cameras capture images of surroundings of the host vehicle and output the captured images as image data. A plurality of cameras is mounted in order to capture images of the front side, the side, and the rear side of the host vehicle. The radars output, as radar information, reflected waves with respect to electromagnetic waves emitted toward the surroundings of the host vehicle. A plurality of radars is mounted in the same manner as the cameras. The LIDAR estimates a three-dimensional position of a reflection point based on the reflected waves of the lasers emitted from the host vehicle in all directions, and outputs the estimated three-dimensional position as three-dimensional position information. In addition, as the cameras, the radars, and the LIDAR, known ones can be used.

The navigation device map 3 is map information stored in a navigation device that receives position information (latitude and longitude) from an artificial satellite. In addition, the map information is not limited to being stored in a main body of the navigation device, and may be stored in an external storage device capable of communicating with the navigation device. The artificial satellite referred to herein is, for example, a global positioning system (GPS) satellite, a global navigation satellite system (GLONASS) satellite, and a quasi-zenith satellite.

The travel support device 1 and the vehicle behavior control unit 13 are constituted by a microcomputer equipped with a central processing unit (CPU), a read-only memory (ROM), a random-access memory (RAM), and the like. In addition, it is also possible to configure each of the travel support device 1 and the vehicle behavior control unit 13 with a plurality of microcomputers.

The travel support device 1 reads the output information of the sensors 2 and the navigation device map 3, and executes the following processing.

A host vehicle position estimation unit 5 estimates a specific current position of the host vehicle by matching a current position of the host vehicle received by the navigation device with a high-precision map 4. The high-precision map 4 may be stored in advance in the travel support device 1, or may be stored in an external storage device capable of communicating with the travel support device 1. The high-precision map 4 has a higher accuracy of position than the navigation device map 3. Further, the navigation device map 3 does not have detailed information on a travel lane of a road, but the high-precision map 4 has detailed information on the travel lane. In addition, if the position information from the artificial satellite cannot be acquired, the host vehicle position estimation unit 5 identifies the current position by using the image information of the cameras.

An object recognition unit 7 determines whether a detected object is a vehicle, a pedestrian, or another object, and further determines directions of travel thereof based on the information detected by the sensors 2.

A surrounding recognition integration unit 6 matches the estimated position of the host vehicle, the information detected by the sensors 2, and the information recognized by the object recognition unit 7 with the high-precision map 4 and the navigation device map 3, thereby generating data indicating the current position of the host vehicle, what is around the host vehicle, and where it is around the host vehicle. In addition, the surrounding recognition integration unit 6 can rewrite the data if the surrounding environment changes during traveling.

A destination setting unit 8 sets a destination input by an operator on the navigation device map 3. A route setting unit 9 sets a travel route on the navigation device map 3 from the current position of the host vehicle to the destination.

An action determining unit 10 sets a plurality of control determining points on the travel route based on the travel route to the destination and information from the surrounding recognition integration unit 6 and the object recognition unit 7, and determines whether to run or stop at each of the control determining points. The travel route to the destination and the information from the surrounding recognition integration unit 6 and the object recognition unit 7 are also referred to as travel situation information. The travel situation includes a situation on a road structure, such as a stop line or a temporary stop, in addition to a situation where the host vehicle intersects with a cross-point or another vehicle. The setting of the control determining points and the determination of run/stop will be described hereinafter. In addition, at the control determining points, other actions such as run and stop may be added and determined (for example, slow down).

The travelable region generation unit 11 determines a region in which the host vehicle can travel based on the information from the high-precision map 4, the surrounding recognition integration unit 6, and the object recognition unit 7. Specifically, it is determined which lane in which the host vehicle travels and at which position in the travel lane the host vehicle is traveling. For example, when a bicycle is traveling in front of the travel lane in which the host vehicle is currently traveling, a travel position is set such that an appropriate distance can be secured between the host vehicle and the bicycle at a time of overtaking. In addition, if there is a parked vehicle in front of the currently traveling lane, it is determined whether the parked vehicle can be avoided while the host vehicle is kept in the currently traveling lane or it is necessary to change the lane.

A trajectory generation unit 12 generates a travel trajectory of the host vehicle (hereinafter, this travel trajectory is also referred to as a first route) based on the set travel route to the destination, the result of determination by the action determining unit 10, and a travelable region determined by the travelable region generation unit 11. The travel trajectory herein includes a vehicle speed profile in addition to a trajectory relating to a position such as where the lane change is performed and where the host vehicle starts or stops on the travel route to the destination. For example, when there is a curve on the travel route, the vehicle speed profile is set such that the host vehicle decelerates in front of the curve and accelerates after passing through the curve.

The travel trajectory generated as described above is output as data from the travel support device 1 to the vehicle behavior control unit 13. The vehicle behavior control unit 13 controls a driving source, a braking device, a steering device, and the like of the vehicle based on the travel trajectory.

Next, the control determining points set by the action determining unit 10 will be described.

The action determining unit 10 extracts an event that needs to determine whether to run or stop on the first route (hereinafter, also referred to as a determining necessary event). The determining necessary event is a matter, an event or a situation such as an event in which traffic lights are installed, an event in which the host vehicle passes through an intersection with a second route that is a route of another vehicle or a pedestrian, an event in which the host vehicle enters the second route from the first route, an event in which the host vehicle passes another vehicle, and the like. The event can be expressed as a place where the host vehicle encounters the matter, or the like. Therefore, in this embodiment, the event may be specified by position information.

The action determining unit 10 plots a plurality of extracted determining necessary events on the first route, and sets the control determining points before the determining necessary events. The control determining points can be set at the time when the travel route to the destination is set.

Before reaching the control determining points, the action determining unit 10 determines whether to run or stop at the control determining points. The vehicle behavior control unit 13 causes the host vehicle to run or stop at the control determining points according to a determination result. For example, when the determining necessary events are installation locations of the traffic lights, the control determining points are set in front of the traffic lights, and whether to run or stop is determined in front of the control determining points based on the image information from the cameras. In addition, the information on the traffic lights may be acquired by road-to-vehicle communication. In addition, when the determining necessary events are a temporary stop line, the control determining points are set before the temporary stop line, and the host vehicle is stopped at the control determining points based on the image information from the cameras.

With respect to this, when the vehicle travels without providing a control determining point, the vehicle travels while acquiring and processing all pieces of information that can be acquired, sets a stop position after recognizing that there are traffic lights ahead, and determines whether to run or stop according to states of the traffic lights.

That is, in a control in which a control determining point is not provided, the stop position of the host vehicle is determined according to a surrounding situation including movement of another vehicle, so it is necessary to recalculate the stop position of the host vehicle according to the situation. Therefore, a new stop position is calculated every time the surrounding situation changes. Furthermore, it is necessary to determine the stop position based on a control model of the vehicle.

With respect to this, when the control determining points are set in advance as in this embodiment, the stop position is also determined in advance, and thus a calculation load can be reduced as compared with the control in which the control determining point is not provided.

Figure 2:
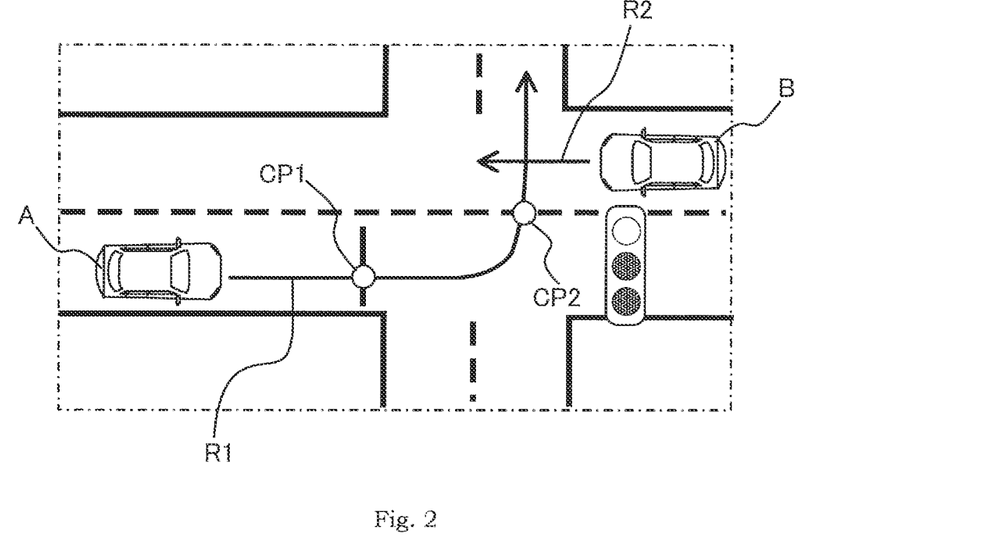
FIG. 2 is a diagram illustrating control of a comparative example in a situation where a host vehicle crosses an oncoming lane and passes through a cross-point.

FIG. 2 illustrates a situation where the host vehicle crosses an oncoming lane and passes through a cross-point. In the figure, A is the host vehicle, B is another vehicle, R1 is a first route, and R2 is a second route.

In this situation, the determining necessary events are the traffic lights installed at the cross-point, and the intersection of the first route R1 and the second route R2.

First, a case where control determining points are set at a stop line in front of the cross-point and an intersection of the first route R1 and the travel lane on which the other vehicle B travels will be examined. In a case where the traffic lights are in a lighting state for prompting the vehicle to run, the host vehicle passes through a first control determining point CP1 set to the stop line and enters the cross-point. Then, when it is recognized that the other vehicle B is approaching, the host vehicle stops at a second control determining point CP2 set at a point at which the first route R1 and the travel lane in which the other vehicle B travels intersect with each other. On the other hand, when it is recognized that the distance to the other vehicle B is sufficient, the host vehicle passes through the second control determining point CP2.

In addition, In FIG. 2, the first control determining point CP1 is displayed on the stop line, and the second control determining point CP2 is displayed on a center line, but this means a stop position where a front edge of the host vehicle does not cross the stop line and the center line. The same applies to other drawings described below.

Incidentally, after passing through the first control determining point CP1, it may be necessary to change the determination for the second control determining point CP2 from run to stop. For example, this is a case where the other vehicle B, which has not been recognized until then, is recognized by approaching the second control determining point CP2 and being able to accurately detect the surrounding situation, or a case where the other vehicle B accelerates or decelerates and a positional relation between the host vehicle A and the other vehicle B changes.

Even in such a case, the host vehicle tries to run to the second control determining point CP2 after passing through the first control determining point CP1, but at that time, the following problem may occur.

(1) It is not possible to perform driving in which the host vehicle stops before the second control determining point CP2 and gradually approaches the second control determining point CP2 from there.

(2) In order to gradually approach the second control determining point CP2, the speed has to be reduced from the first control determining point CP1.

(3) It is not possible to perform driving of gradually moving or stopping before the second control determining point CP2 and approaching the second control determining point CP2 after checking the surrounding situation.

(4) When a human drives the host vehicle, if the width of the travel lane is small, the host vehicle tends to be stopped before the second control determining point CP2 in order to maintain the distance to the other vehicle B at the time of passing, but such driving cannot be performed.

That is, with only the two control determining points described above, it is not possible to flexibly drive according to a change in the surrounding situation after passing through the first control determining point CP1.

Therefore, in this embodiment, the control determining points are set as described below.

Figure 3:
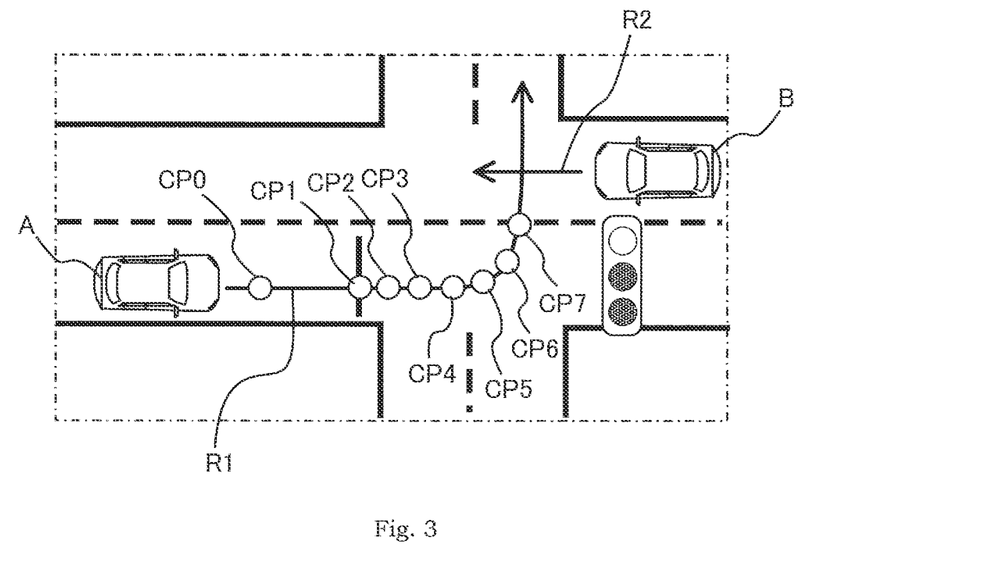
FIG. 3 is a diagram illustrating control according to an embodiment of the present disclosure in a situation where a host vehicle crosses an oncoming lane and passes through a cross-point.

FIG. 3 shows an example of control determining points set in this embodiment in the same situation as in FIG. 2. The control determining points (a first control determining point CP1 and a seventh control determining points CP7) are set at two points, that is, a stop line before a cross-point and a point at which a first route R1 and a center line intersect with each other, as in FIG. 2, but in this embodiment, five control determining points of a second control determining point CP2 to a sixth control determining point CP6 are set between the first control determining point CP1 and the seventh control determining point CP7. In addition, an initial control determining point CP0 of control of turning at the cross-point is set before the stop line. The interval between adjacent control determining points will be described later.

As described above, in this embodiment, the control determining points are densely set in a section from the stop line as the start position of the cross-point to an intersection of the first route R1 and the travel lane on which another vehicle B travels. In addition, when there is no stop line, the start position of the cross-point is set based on map information.

As described above, when the control determining points are densely set in the cross-point, for example, it is possible to determine that the host vehicle travels to a third control determining point CP3 before entering the cross-point and stops after a fourth control determining point CP4, to detect the surrounding situation in a state where the host vehicle stops at the fourth control determining point CP4, and to change the determination such that the host vehicle travels to the seventh control determining point CP7. In addition, when it is determined that the host vehicle is traveling to the third control determining point CP3 before entering the cross-point and is stopped after the fourth control determining point CP4, the determination of a fifth control determining point CP5 and the sixth control determining point CP6 may be changed to run according to a change in the surrounding situation after entering the cross-point, and the host vehicle may be stopped at the seventh control determining point CP7. By densely setting the control determining points in the cross-point in this way, it is possible to solve the above-mentioned problems and make action determining with high reliability.

Figure 4:
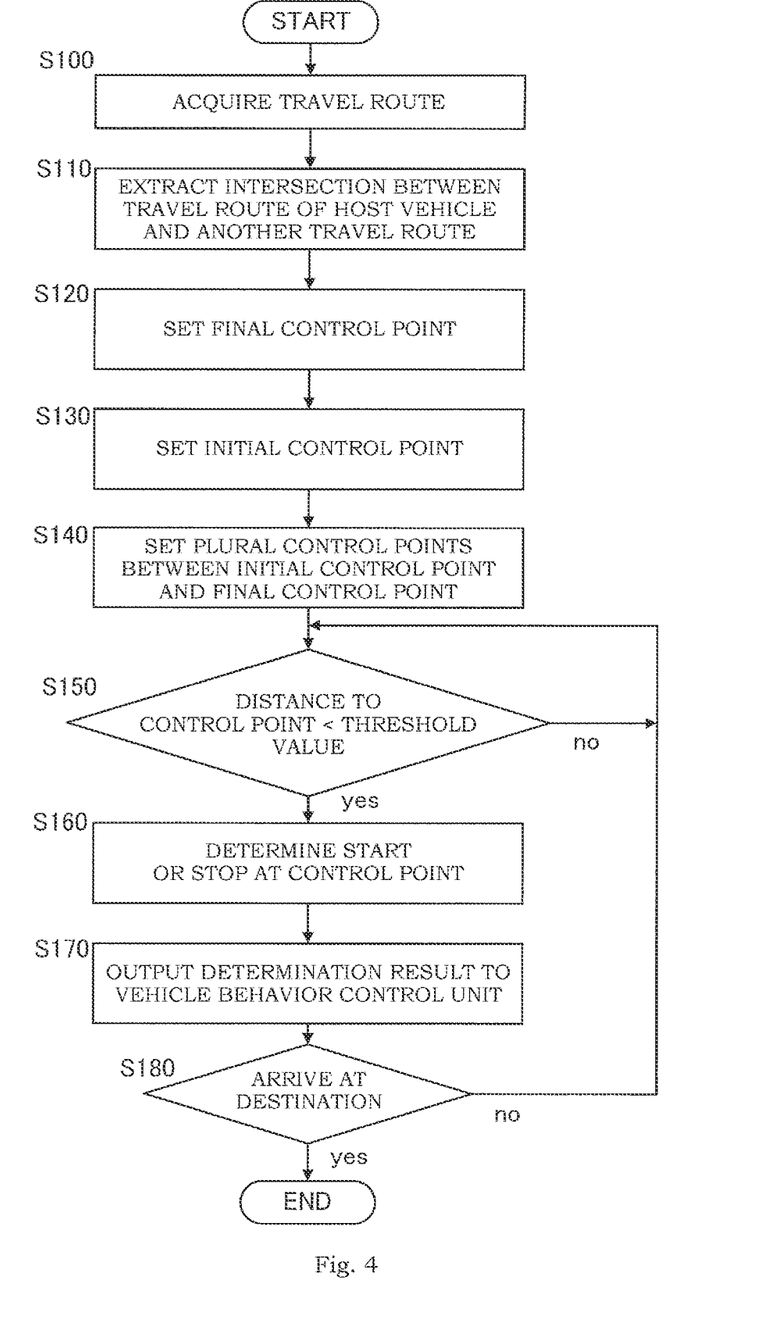
FIG. 4 is a diagram illustrating a control routine executed by an action determining unit.

Next, a control routine executed by the action determining unit 10 as a part of the controller in this embodiment will be described.

FIG. 4 is a diagram for illustrating the control routine executed by the action determining unit 10. Hereinafter, steps will be described.

In step S100, the action determining unit 10 acquires a first route, which is a travel route of the host vehicle.

In step S110, the action determining unit 10 extracts an intersection of the first route and a second route, which is a route of another vehicle or a pedestrian, based on the map information. The second route is a road on which the other vehicle or the pedestrian travels or walks with priority over the host vehicle among roads on which other vehicles or pedestrians travel or walk. In addition, the roads on which the other vehicles or the pedestrians travel or walk in this step are roads on which the other vehicles or the pedestrians may travel or walk. That is, the process of this step is executed based on the map information without detecting specific another vehicle or pedestrian by the sensors 2.

In step S120, the action determining unit 10 sets a final control determining point in a range in which the control determining points are provided based on the extracted intersection. In the case of the situation of FIG. 3, based on the intersection of the first route R1 and the second route R2, the seventh control determining point CP7 as the final control determining point is set at the intersection of a center line and a travel lane on which the other vehicle B travels before the intersection of the first route R1 and the second route R2.

In step S130, the action determining unit 10 sets the initial control determining point in the range in which the control determining points are provided. In the case of the situation of FIG. 3, the initial control determining point CP0 is set.

In step S140, the action determining unit 10 sets a plurality of control determining points between the initial control determining point and the final control determining point. At this time, a range in which the control determining points are densely positioned is provided. The number of control determining points to be set is arbitrary. Specifically, the first control determining point CP1 is set as an initial control determining point in a range that becomes dense on the stop line before the cross-point. In addition, the first control determining point CP1 may be set before the cross-point and may be set before the stop line. However, as the number of control determining points increases, calculation load increases, and therefore, in this embodiment, the first control determining point CP1 is set at the stop line in consideration of the calculation load. In addition, the final control determining point in the dense range is the seventh control determining point CP7.

The intervals between the adjacent control determining points are set such that controllable ranges of the control determining points overlap each other. The controllable ranges are ranges of deviation from the control determining points that can be set when control is performed to stop at a position deviated from the control determining points. This is based on a premise that the action determining unit 10 can perform not only the control of stopping the host vehicle at the control determining point but also the control of stopping the host vehicle at a position X[cm] before the control determining point or at a position Y[cm] behind the control determining point.

The controllable ranges can be set arbitrarily. However, the controllable ranges on the front side and the controllable ranges on the back side do not need to be the same with respect to the control determining points. In addition, it is not necessary to set a plurality of control determining points at equal intervals in the range in which the control determining points are densely set. For example, by shortening the interval as it approaches the final control determining point, it may be easier to respond to changes in the situation after entering the cross-point.

By setting a plurality of control determining points such that the controllable ranges overlap as described above, it is possible to stop the host vehicle at an arbitrary position between adjacent control determining points.

In addition, instead of overlapping the controllable ranges, allowable positional deviation ranges may be set to overlap. The allowable positional deviation range is a range of deviation between an actually stopped position and a control determining point, which is allowable when control is performed to stop at the control determining point. For example, in a case where a vehicle is stopped on an uphill slope road or in a case where a vehicle is stopped from traveling at a low speed, the vehicle tends to stop before a control determining point, but if this is not allowed at all, the control becomes complicated. Therefore, an allowable range is provided for the positional deviation. The allowable degree can be set arbitrarily. By setting the allowable positional deviation ranges so as to overlap each other, it is possible to stop the host vehicle within an allowable range from a control determining point to be stopped. In addition, the allowable positional deviation ranges may be arbitrarily set, but may be changed according to a magnitude of road surface resistance. For example, when it is raining, the road surface resistance decreases and a braking distance increases, and thus the allowable range behind the control determining point may be expanded.

As described above, when a plurality of control determining points are set, the action determining unit 10 determines in step S150 whether or not a distance to a control determining point ahead of a current position of the host vehicle in a traveling direction is less than a threshold value, and when a determination result is affirmative, the action determining unit 10 performs step S160, and when a determination result is negative, the action determining unit 10 repeatedly performs step S150. Although the threshold value can be set arbitrarily, the threshold value is set in consideration of information necessary for the determination of the run or stop at a control determining point, for example, a distance at which a state of the traffic lights, presence or absence of an oncoming vehicle, and the like can be detected.

In step S160, the action determining unit 10 determines, based on the information from the surrounding recognition integration unit 6, whether to start or stop at a control determining point closer than the threshold value. That is, the determination of this step is made for other vehicles or pedestrians detected by the sensors 2. For example, when the first control determining point CP1 to the seventh control determining point CP7 are closer than the threshold value in FIG. 3, the start or stop is determined based on the state of the traffic lights, the position and vehicle speed of the other vehicle B, and the like. In addition, data generation in the surrounding recognition integration unit 6 is performed by a control routine different from this control routine.

In step S170, the action determining unit 10 outputs the determination result in step S150 to the vehicle behavior control unit 13. The vehicle behavior control unit 13 controls a driving source, a braking device, and a steering device based on the determination result.

In step S180, the action determining unit 10 determines whether or not the host vehicle has arrived at a destination, ends this routine if the host vehicle has arrived, and returns to step S150 if the host vehicle has not arrived.

The action determining method described above, that is, a method for determining action of the host vehicle by providing a range in which a plurality of control determining points are densely set, is applicable not only to the situation of FIG. 3 but also to other situations described below.

Figure 5:
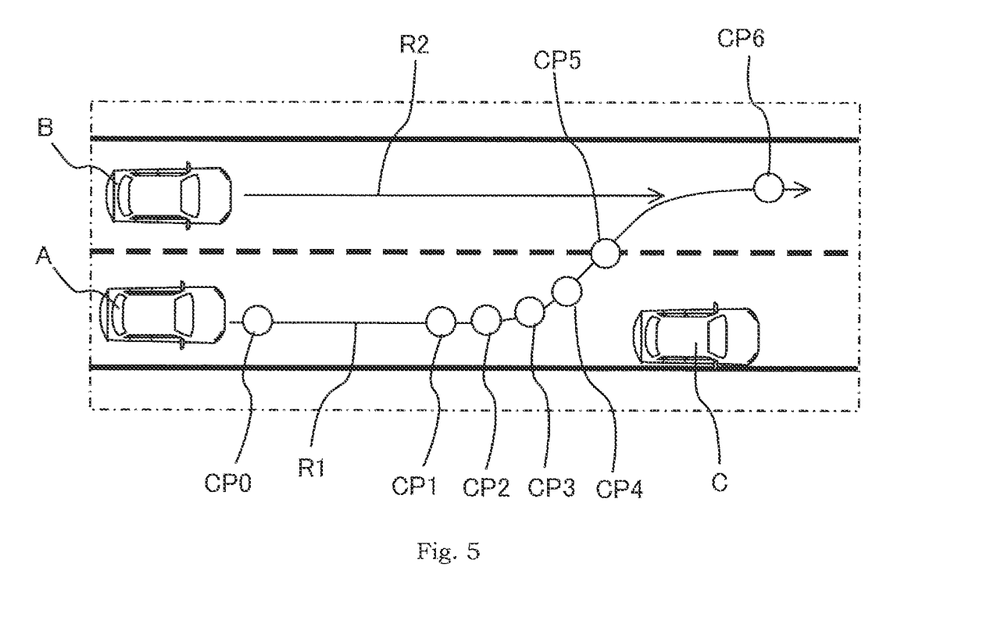
FIG. 5 is a diagram illustrating a situation where a lane change is performed.

FIG. 5 is a situation where a parked vehicle C is present in front of a travel lane in which the host vehicle A travels, and a lane change is performed in order to avoid the parked vehicle C. In this situation, another vehicle B is traveling in a travel lane of a change destination, and the second route R2 of the other vehicle B has an intersection with the first route R1.

When the first route R1 for avoiding the parked vehicle C is generated, the action determining unit 10 sets the control determining point CP0 as a start point of a lane change operation and the control determining point CP6 as an end point, and densely sets the first control determining point CP1 to the fifth control determining point CP5 between the control determining point CP0 and the control determining point CP6. The first control determining point CP1, which is the initial control determining point in the dense range, is a position at which steering is started. The fifth control determining point CP5, which is a final control determining point in the dense range, is an intersection between the travel lane of the change destination and the first route R1. In addition, in this situation, the higher the vehicle speed in the travel lane of the change destination, the farther the denser range is set from the intersection between the travel lane of the change destination and the first route R1. This is because, even when the vehicle speed decreases in the dense range, a section in which the host vehicle accelerates from the final fifth control determining point CP5 until the host vehicle enters the travel lane of the change destination is secured.

By setting a plurality of control determining points as described above, it is possible to perform lane change while avoiding collision with the parked vehicle C and the other vehicle B. By densely setting the plurality of control determining points from a start point of the lane change operation, it is possible to flexibly respond to a change in a situation such as acceleration or deceleration of the other vehicle B. In addition, a case where a travel lane in which the host vehicle A travels joins a travel lane in which the other vehicle B travels, such as joining in a high-speed motorway, is similar to a case of FIG. 5.

Figure 6:
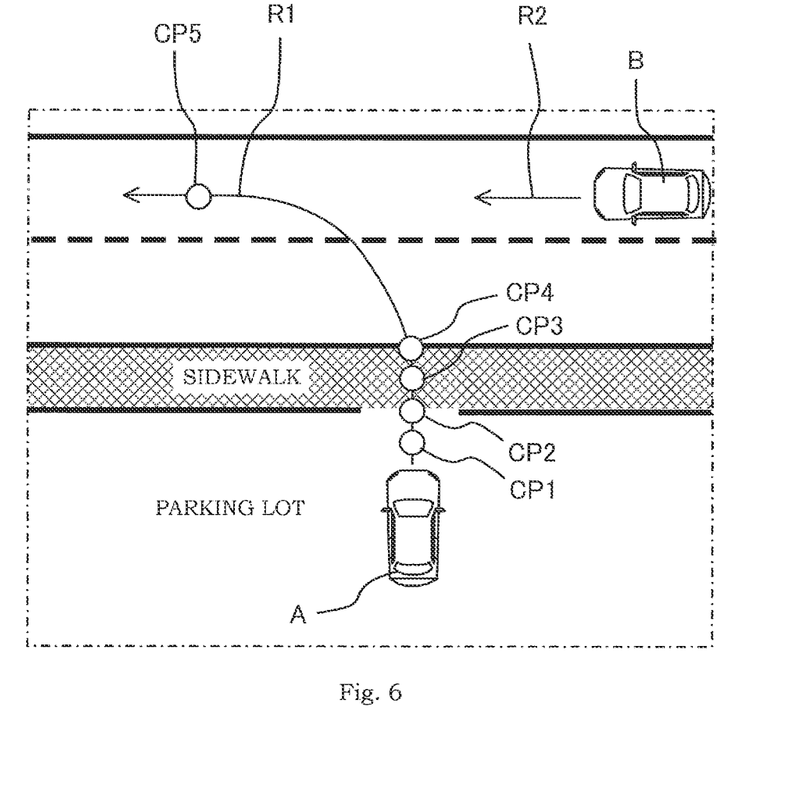
FIG. 6 is a diagram illustrating a situation where a vehicle joins a road from a parking lot on a wayside.

FIG. 6 shows a situation where the host vehicle A joins a road on which the other vehicle B travels from a parking lot on a wayside. It is assumed that there is a sidewalk between the parking lot and the road.

When the first route R1 that passes through the sidewalk from the parking lot and joins the road is generated, the action determining unit 10 sets the first control determining point CP1 as the start point of a joining operation and the fifth control determining point CP5 as the end point, and densely sets the second control determining point CP2 to the fourth control determining point CP4 between the first control determining point CP1 and the fifth control determining point CP5. In addition, in this situation, the first control determining point CP1 to the fourth control determining point CP4 are in a dense range.

The fourth control determining point CP4, which is the end point of the dense range, is a boundary between the sidewalk and the road. In addition, a control determining point is also set at a boundary between the parking lot and the sidewalk. In FIG. 6, the second control determining point CP2 corresponds to this control determining point.

When the control determining points are set as described above, first, it is determined whether or not the host vehicle should stop before the sidewalk, and if there is a pedestrian on a route that intersects the first route R1, the host vehicle will stop at the second control determining point CP2. When there is no pedestrian or when a pedestrian passes by, the host vehicle passes through the second control determining point CP2 and the third control determining point CP3 and approaches the fourth control determining point CP4. Then, a road condition at a joining destination is detected, and it is determined whether or not to stop at the fourth control determining point CP4.

By setting a plurality of control determining points as described above, it is possible to join while avoiding a collision with the pedestrian and the other vehicle B traveling on the road. Then, by providing a range in which a plurality of control determining points are densely set, even if there is a change in the condition of the sidewalk or the road at the joining destination, it is possible to flexibly respond.

By the way, it may be difficult to determine whether to run or stop. In such a case, the control determining point may be added on a traveling direction side of the end point of the dense range. This will be described with reference to FIG. 7.

Figure 7:
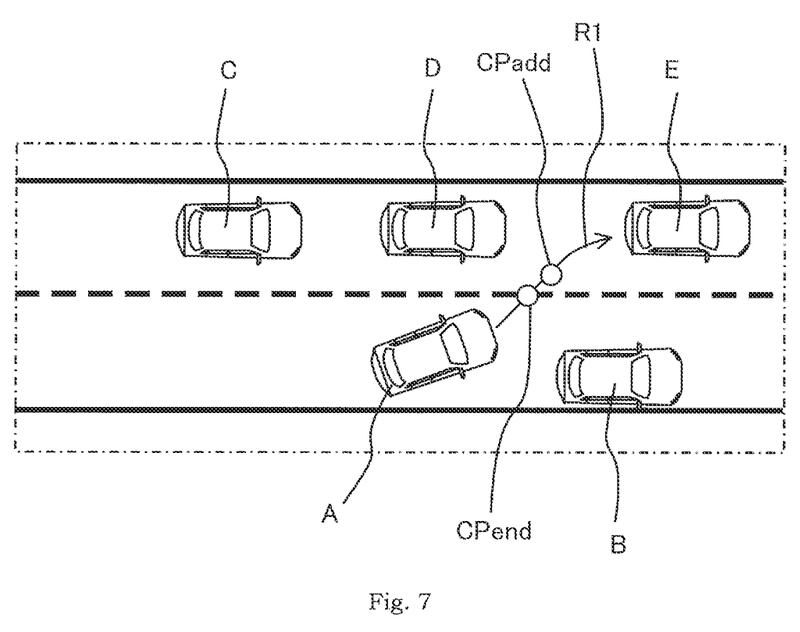
FIG. 7 is a diagram illustrating a situation where a lane change is performed during traffic congestion.

FIG. 7 is a situation of changing a lane in order to avoid a parked vehicle in front of a travel lane in which the host vehicle A travels as in FIG. 5. However, the travel lane to be changed is congested, and a first other vehicle C to a third other vehicle E is in the vicinity of the host vehicle A. A final control determining point CPend is a control determining point corresponding to the fifth control determining point CP5 in FIG. 5.

In this situation, it is assumed that the first route R1 joining between a second other vehicle D and the third other vehicle E is generated.

In this situation, since it is determined whether or not a driver of the second other vehicle D should stop depending on whether or not the driver of the second other vehicle D intends to accept the joining of the host vehicle A, it is difficult to determine whether or not the host vehicle A should run based only on a positional relation between the second other vehicle D and the host vehicle A. That is, even if it is determined that the host vehicle stops at the final control determining point CPend based on a reason that the second other vehicle D is detected, it can be said that the reliability of the determination is low. In such a case, an additional control determining point CPadd is set on the traveling direction side of the final control determining point CPend. Then, the host vehicle is slowly moved to the additional control determining point CPadd. When the additional control determining point CPadd is set, an interval between the additional control determining point CPadd and the final control determining point CPend is set such that the controllable ranges or the allowable positional deviation ranges described above overlap.

In addition, in the situation of FIG. 6, a control determining point may be added in a case where it is difficult to make a determination with high reliability up to the fourth control determining point CP4 due to a reason such as the presence of a parked vehicle on a road.

In this embodiment as described above, by using the controller that acquires travel situation information of the road on which the host vehicle travels detected by the sensors and determines the driving action from the travel situation information, at least one control determining point for determining run or stop of the host vehicle is set on the first route on which the host vehicle travels by using the travel situation information, and it is determined whether to cause the host vehicle to run or stop at the control determining point before the host vehicle reaches the control determining point. The controller further determines, by using the travel situation information, whether or not the host vehicle enters a road on which another vehicle or a pedestrian travels or walks with priority over the host vehicle in the first route along which the host vehicle travels, and sets control determining points in a case where it is determined that the host vehicle enters the road on which the other vehicle or the pedestrian travels or walks with priority over the host vehicle more densely than in other cases. In addition, the travel situation information includes a situation on a road structure, such as a stop line or a temporary stop, in addition to a situation where the host vehicle intersects with a cross-point or another vehicle. Therefore, the sensors referred to here are not limited to the sensors 2, but also include those that extract map data from the Global Navigation Satellite System (GNSS) information for detecting the road structure.

As a result, even if the surrounding situation changes while traveling in front of an event, appropriate control can be executed according to the situation. For example, when the other vehicle or the like that has not been detected until then is detected, the determination of the host vehicle is switched, and the host vehicle can travel based on the determination after the switching. It is also possible to gradually approach the event by switching to stop or slow down before the event. By increasing the number of control determining points, it is also possible to switch from an appropriate position before the event to slow down. In addition, in a situation where it is necessary to reliably determine the run or the stop, it is possible to stop before the event, and to switch to the run to approach the event after the surrounding situation is detected. As described above, according to this embodiment, the determinations regarding a plurality of control determining points are accumulated to determine the stop or run, so that a highly reliable determination result can be acquired.

As described above, the case where the host vehicle enters the road on which the other vehicle or the pedestrian travels or walks with priority over the host vehicle has been described, but when the host vehicle does not enter the road, a control determining point may be set only at a position where it is necessary to determine whether to run or stop the host vehicle on the first route. For example, in a case where a parked vehicle is present in front while the host vehicle traveling on a narrow road, and the host vehicle stops in front of the parked vehicle, or in a case where the host vehicle stops on a temporary stop line at a cross-point, the control determining point is set only at a stop position.

In this embodiment, the intersection between the first route and the road on which the other vehicle or the pedestrian travels or walks with priority over the host vehicle is extracted, and the control determining points are densely set based on the intersection. As described above, it is possible to increase the number of control determining points before the host vehicle enters the road on which the other vehicle or the pedestrian travels or walks with priority over the host vehicle. As a result, a position to be run and a position to be stopped can be flexibly set according to the surrounding conditions during traveling.

In this embodiment, the control determining points are densely set between the intersection of the host vehicle and the road on which the other vehicle or the pedestrian travels or walks with priority over the host vehicle. As a result, a region in which the control determining points are increased is limited, so that it is possible to suppress an unnecessary increase in the control determining points and reduce the calculation load.

In this embodiment, in a situation where the host vehicle passes through the cross-point, the controller sets the start point of the region in which the control determining points are densely set to the start position of the cross-point at which the first route and the road on which the other vehicle or the pedestrian travels or walks with priority over the host vehicle intersect. Accordingly, it is possible to reliably switch in a section where it may be necessary to switch the determination. In addition, when there is a stop line, the start position of the cross-point may be the stop line. In a case where there is a crosswalk in front of the cross-point, the start position of the cross-point may be a predetermined distance before the crosswalk. In addition, the start point of the region in which the control determining points are densely set may be set to be a predetermined distance before the end point of the region.

In this embodiment, in a situation where the host vehicle passes through the cross-point, the controller sets the end point of the region in which the control determining points are densely set to a position at which the first route intersects with the other vehicle or the pedestrian. Accordingly, it is possible to reliably avoid contact with the other vehicle or the pedestrian. The intersecting position with the other vehicle or the pedestrian is an intersecting position between the first route and the travel lane in which the other vehicle travels, or an intersecting position between the first route and the crosswalk in which the pedestrian walks. In addition, the end point may be a point run in the traveling direction by a predetermined distance from the start point.

In this embodiment, when the host vehicle performs a lane change to a different lane, the controller sets the start point of the region in which the control determining points are densely set as the start point of the lane change operation or the joining operation. Accordingly, it is possible to reliably switch in the section where it may be necessary to switch the determination.

In addition, the start point may be changed according to a speed limit of a changing lane or a joining lane. In this case, the higher the speed limit, the closer the start point is. In addition, the start point may be changed according to road width of the changing lane or the joining lane. In this case, the smaller the road width, the closer the start point is. In either case, the fear of occupants can be alleviated. Further, the start point may be a point just before the end point by a predetermined distance.

In this embodiment, when the host vehicle joins a road from a facility (for example, a parking lot) on a wayside, the controller provides a region for densely setting the control determining points in front of a road of a joining destination. As a result, it is possible to smoothly travel in accordance with situation change until the host vehicle joins the road.

In this embodiment, in the situation where the host vehicle joins the road from the facility on the wayside, the controller sets the end point of the region in which the control determining points are densely set to a position at which the road of the joining destination and the first route intersect with each other. Accordingly, it is possible to reliably avoid contact with the other vehicle and the pedestrian.

In addition, the end point may be changed according to the speed limit of the joining lane. In this case, the higher the speed limit, the closer the end point is. In addition, the end point may be changed according to road width of the joining lane. In this case, the smaller the road width, the closer the end point is. In either case, the fear of occupants can be alleviated. Further, the end point may be a point run in the traveling direction by a predetermined distance from the start point.

In this embodiment, in the situation where the host vehicle joins the road from the facility on the wayside, the controller sets the start point of the region in which the control determining points are densely set to a position before the position at which the travel lane of the joining destination and the first route intersect with each other or a position at which a sidewalk and the first route intersect with each other when there is the sidewalk between the facility and the road. As a result, it is possible to reliably switch in the section where it may be necessary to switch the determination. In addition, the start point may be a point just before the end point by a predetermined distance. In addition, the start point may be set according to a blind spot when the road is viewed from the facility on the wayside. For example, when there is a parked vehicle in the travel lane on the front side in the situation of FIG. 6 and the blind spot becomes larger as the host vehicle A approaches the road, the start point is set to the front side.

In this embodiment, the controller sets the intervals between the control determining points in the region in which the control determining points are densely set such that the controllable ranges of the adjacent control determining points overlap each other or the allowable positional deviation ranges of the adjacent control determining points overlap each other. As a result, when the host vehicle is in a situation to be stopped, the host vehicle can be stopped at a desired position. The intervals between the adjacent control determining points may be the same or different.

In this embodiment, the length of the controllable ranges and the length of the allowable positional deviation ranges are arbitrary values set in accordance with control accuracy of a control system. Therefore, the intervals between the control determining points can be set appropriately.

In this embodiment, the length of the controllable ranges and the length of the allowable positional deviation ranges may be different for each of the control determining points. Therefore, the control determining points can be appropriately arranged according to the event.

In this embodiment, the length of the controllable ranges and the length of the allowable positional deviation ranges may be changed according to the magnitude of the road surface resistance. Therefore, the control determining points can be appropriately arranged according to road surface conditions.

In this embodiment, when the controller determines that the host vehicle does not enter a road on which another vehicle or a pedestrian travels or walks with priority over the host vehicle, the controller sets a control determining point only at a position where it is necessary to determine whether to run or stop the host vehicle on the first route on which the host vehicle travels by using the travel situation information. Accordingly, the number of control determining points is not unnecessarily increased, and thus the calculation load can be reduced.

In this embodiment, when the controller determines that the host vehicle does not enter the road on which the other vehicle or the pedestrian travels or walks with priority over the host vehicle, the controller may set the control determining points at predetermined fixed intervals in the first route on which the host vehicle travels. Thereby, the number of control determining points is not unnecessarily increased, and thus the calculation load can be reduced.

In this embodiment, when the controller determines that the host vehicle does not enter the road on which the other vehicle or the pedestrian travels or walks with priority over the host vehicle, the controller sets the control determining points according to the vehicle speed of the host vehicle such that the higher the vehicle speed, the wider the interval in the first route on which the host vehicle travels. This is because the higher the vehicle speed is, the higher the possibility that the vehicle travels straight at a constant vehicle speed is, and when the vehicle travels straight at the constant vehicle speed, a frequency of intersecting with the other vehicle or the pedestrian is low. Accordingly, since the control determining points are set in accordance with the vehicle speed of the host vehicle, that is, the probability of intersecting with the other vehicle or the pedestrian, it is possible to prevent the control determining points from being unnecessarily increased and to reduce the calculation load.

Figure 8:
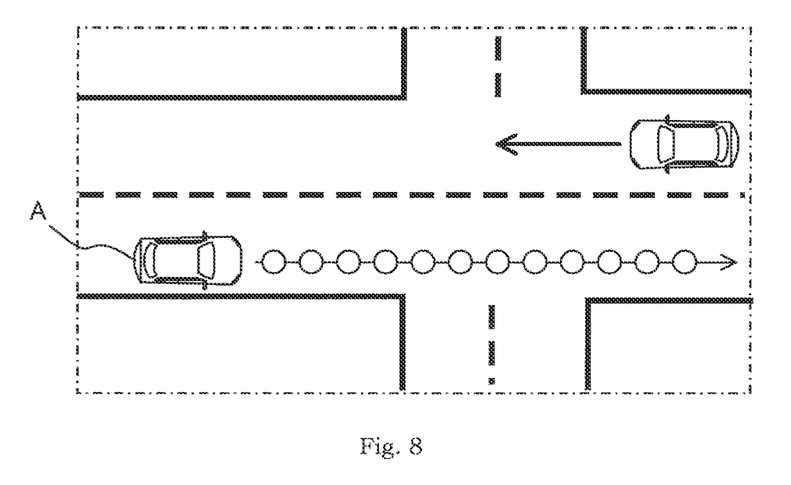
FIG. 8 is a diagram illustrating a situation where a vehicle travels straight through a cross-point.

In addition, in this embodiment, a case where a route of the host vehicle and a route of the other vehicle or the pedestrian have an intersection has been described, but it is effective to provide a range in which the control determining points are densely set even in other cases. For example, as illustrated in FIG. 8, when the host vehicle travels straight through the intersection, the control determining points may be densely set before and after the intersection. Accordingly, when there is a change in a situation in the intersection, it is possible to flexibly respond to the change.

Although the embodiment of the present disclosure has been described above, the above-mentioned embodiment is merely a part of application examples of the present disclosure, and does not mean that the technical scope of the present disclosure is limited to a specific configuration of the above-described embodiment.

The invention claimed is:

1. A method for determining a vehicle action, applicable to a travel control device, comprising:
   by a controller configured to acquire travel situation information of a road on which a host vehicle travels detected by a sensor and determine a driving action based on the travel situation information,
   setting one or more control determining points on a first route on which the host vehicle travels while traveling on the first route, the control determining points determining whether to run or stop the host vehicle by using the travel situation information; and
   determining whether to run or stop the host vehicle at the control determining points before the host vehicle reaches the control determining point,
   wherein
   the controller is further configured to:
   determine, based on the travel situation information, whether or not the host vehicle enters a road on which another vehicle or a pedestrian travels or walks with priority over the host vehicle while traveling on the first route on which the host vehicle travels; and
   in a case where it is determined that the host vehicle enters the road on which the other vehicle or the pedestrian travels or walks with priority over the host vehicle, set the control determining points more densely than in other cases.

2. The method for determining the vehicle action according to claim 1, further comprising:
   by the controller, extracting an intersection between the first route and the road on which the other vehicle or the pedestrian travels or walks with priority over the host vehicle; and
   densely setting the control determining points with reference to the intersection.

3. The method for determining the vehicle action according to claim 2, further comprising:
  densely setting, by the controller, the control determining points between the host vehicle and the intersection.

4. The method for determining the vehicle action according to claim 3, further comprising:
  setting, by the controller, a start point of a region in which the control determining points are densely set at a start position of a cross-point at which the first route intersects with the road on which the other vehicle or the pedestrian travels or walks with priority over the host vehicle.

5. The method for determining the vehicle action according to claim 3, further comprising:
  setting, by the controller, an end point of a region in which control determining points are densely set at a position where the first route intersects with the other vehicle or the pedestrian.

6. The method for determining the vehicle action according to claim 5, further comprising:
  setting, by the controller, a start point of the region in which the control determining points are densely set at a start point of a lane change operation or a joining operation when the host vehicle performs a lane change to a different lane.

7. The method for determining the vehicle action according to claim 1, further comprising:
  in a case where the host vehicle joins a road from a facility on a wayside, providing, by the controller, a region for densely setting the control determining points in front of the road of a joining destination.

8. The method for determining the vehicle action according to claim 7, further comprising:
  setting, by the controller, an end point of the region in which the control determining points are densely set at a position where the road of the joining destination intersects with the first route.

9. The method for determining the vehicle action according to claim 8, further comprising:
  setting, by the controller, a start point of the region in which the control determining points are densely set at a position in front of a position at which a travel lane of the joining destination and the first route intersect with each other or a position at which a sidewalk and the first route intersect with each other when there is the sidewalk between the facility and the road.

10. The method for determining the vehicle action according to claim 1, further comprising:
  setting, by the controller, intervals between the control determining points in the region in which the control determining points are densely set such that controllable ranges of adjacent control determining points overlap each other or allowable positional deviation ranges of adjacent control determining points overlap each other.

11. The method for determining the vehicle action according to claim 10, wherein
  a length of the controllable ranges and a length of the allowable positional deviation ranges are arbitrary values set in accordance with control accuracy of a control system.

12. The method for determining the vehicle action according to claim 10, wherein
  a length of the controllable ranges and a length of the allowable positional deviation ranges are made different for each of the control determining points.

13. The method for determining the vehicle action according to claim 10, wherein
  the length of the controllable ranges and the length of the allowable positional deviation ranges are changed in accordance with a magnitude of a road surface resistance.

14. The method for determining the vehicle action according to claim 1, further comprising:
  in a case where the controller determines that the host vehicle does not enter the road on which the other vehicle or the pedestrian travels or walks with priority over the host vehicle, setting, by the controller, the control determining points only at a position where it is necessary to determine whether to run or stop the host vehicle on the first route on which the host vehicle travels by using the travel situation information.

15. The method for determining the vehicle action according to claim 1, further comprising:
  in a case where the controller determines that the host vehicle does not enter the road on which the other vehicle or the pedestrian travels or walks with priority over the host vehicle, setting, by the controller, the control determining points at predetermined fixed intervals on the first route on which the host vehicle travels.

16. The method for determining the vehicle action according to claim 1, further comprising:
  in a case where the controller determines that the host vehicle does not enter the road on which the other vehicle or the pedestrian travels or walks with priority over the host vehicle, setting, by the controller, the control determining points according to a vehicle speed of the host vehicle such that intervals become wider as the vehicle speed of the host vehicle becomes higher in the first route on which the host vehicle travels.

17. An apparatus for determining a vehicle action, applicable to a travel control device, comprising:
  a controller configured to acquire travel situation information of a road on which a host vehicle travels detected by a sensor and determine a driving action from the travel situation information; wherein
  the controller is further configured to:
  set one or more control determining points on a first route on which the host vehicle travels while traveling on the first route, the control determining points determining whether to run or stop the host vehicle by using the travel situation information;
  determine whether to run or stop the host vehicle at the control determining points before the host vehicle reaches the control determining point;
  determine, by using the travel situation information, whether or not the host vehicle enters a road on which another vehicle or a pedestrian travels or walks with priority over the host vehicle on the first route on which the host vehicle travels; and
  in a case where it is determined that the host vehicle enters the road on which the other vehicle or the pedestrian travels or walks with priority over the host vehicle, set the control determining points more densely than in other cases.

* * * * *